United States Patent
Jung et al.

(10) Patent No.: US 9,503,454 B2
(45) Date of Patent: Nov. 22, 2016

(54) SMART CARD SERVICE METHOD AND APPARATUS FOR PERFORMING THE SAME

(71) Applicant: ELECTRONICS & TELECOMMUNICATIONS RESEARCH INSTITUTE, Daejeon (KR)

(72) Inventors: Young Woo Jung, Daejeon (KR); Chang Won Ahn, Daejeon (KR); Joong Soo Lee, Daejeon (KR)

(73) Assignee: ELECTRONICS & TELECOMMUNICATIONS RESEARCH INSTITUTE, Daejeon (KR)

( * ) Notice: Subject to any disclaimer, the term of this patent is extended or adjusted under 35 U.S.C. 154(b) by 49 days.

(21) Appl. No.: 14/056,124

(22) Filed: Oct. 17, 2013

(65) Prior Publication Data

US 2014/0115675 A1   Apr. 24, 2014

(30) Foreign Application Priority Data

Oct. 18, 2012  (KR) .................. 10-2012-0115855
Oct. 15, 2013  (KR) .................. 10-2013-0122300

(51) Int. Cl.

| | | |
|---|---|---|
| *G06F 15/177* | (2006.01) | |
| *H04L 29/06* | (2006.01) | |
| *G06F 7/04* | (2006.01) | |
| *G06F 17/30* | (2006.01) | |
| *H04W 4/00* | (2009.01) | |
| *H04L 29/08* | (2006.01) | |

(52) U.S. Cl.
CPC ....... *H04L 63/0853* (2013.01); *H04L 63/0823* (2013.01); *H04L 67/10* (2013.01); *H04W 4/003* (2013.01)

(58) Field of Classification Search
CPC ............ H04L 9/3263; H04L 63/0853; H04L 29/08846; H04L 29/06802; H04W 8/183; H04W 8/20; H04W 8/205; H04W 12/06; G06F 3/0662; G06F 3/0664; G06F 3/0665
See application file for complete search history.

(56) References Cited

U.S. PATENT DOCUMENTS

| | | | |
|---|---|---|---|
| 8,397,306 B1 * | 3/2013 | Tormasov ............... | G06F 21/00 713/164 |
| 8,494,485 B1 * | 7/2013 | Broch ........................... | 455/410 |
| 2005/0246292 A1 * | 11/2005 | Sarcanin ........................ | 705/67 |
| 2005/0289085 A1 * | 12/2005 | Hamber ......................... | 705/67 |
| 2006/0205388 A1 * | 9/2006 | Semple et al. ................ | 455/411 |
| 2009/0163175 A1 * | 6/2009 | Shi et al. ...................... | 455/411 |
| 2009/0172407 A1 | 7/2009 | Smith et al. | |
| 2009/0227234 A1 * | 9/2009 | Bosch et al. .................. | 455/411 |

(Continued)

FOREIGN PATENT DOCUMENTS

KR   1020060022864 A   3/2006

*Primary Examiner* — Tae Kim
(74) *Attorney, Agent, or Firm* — Ladas & Parry LLP

(57) ABSTRACT

Provided are a smart card service method and an apparatus for performing the same. The smart card service method includes receiving a certificate generation request from a terminal, transmitting the certificate generation request to an authentication processing device, and storing credential information with respect to the generated certificate in a virtual machine associated with the terminal in response to a certificate generation success message provided from the authentication processing device. Thus, it is possible to reduce costs in accordance with manufacturing smart card hardware, and support smart card services in a more enhanced security environment.

6 Claims, 5 Drawing Sheets

(56) References Cited

U.S. PATENT DOCUMENTS

| | | | |
|---|---|---|---|
| 2009/0285118 A1* | 11/2009 | Yoshikawa et al. | 370/254 |
| 2010/0210304 A1* | 8/2010 | Huslak | G06Q 10/10 455/558 |
| 2010/0248690 A1* | 9/2010 | Biggs | H04W 36/385 455/411 |
| 2010/0278322 A1* | 11/2010 | Krantz et al. | 379/93.03 |
| 2010/0311391 A1* | 12/2010 | Siu | H04W 8/205 455/411 |
| 2010/0327059 A1* | 12/2010 | Dean et al. | 235/435 |
| 2010/0330961 A1* | 12/2010 | Rogel | G06F 21/31 455/411 |
| 2011/0306318 A1* | 12/2011 | Rodgers | H04W 8/183 455/410 |
| 2012/0246581 A1* | 9/2012 | Engestrom | G06Q 50/01 715/753 |
| 2012/0260090 A1* | 10/2012 | Hauck et al. | 713/168 |
| 2013/0012168 A1* | 1/2013 | Rajadurai et al. | 455/411 |
| 2013/0060851 A1* | 3/2013 | Davis et al. | 709/204 |
| 2013/0061050 A1* | 3/2013 | Davis et al. | 713/168 |
| 2013/0061333 A1* | 3/2013 | Davis et al. | 726/28 |
| 2013/0346745 A1* | 12/2013 | Broch | 713/156 |

* cited by examiner

SMART CARD SERVICE METHOD AND APPARATUS FOR PERFORMING THE SAME

CLAIM FOR PRIORITY

This application claims priority to Korean Patent Application No. 10-2012-0115855, filed on Oct. 18, 2012 and No. 10-2013-0122300, filed on Oct. 15, 2013 in the Korean Intellectual Property Office (KIPO), the entire contents of which are hereby incorporated by reference.

BACKGROUND

1. Technical Field

Example embodiments of the present invention relate in general to smart card service technology, and more particularly, to a smart card service method which virtualizes a smart card to provide the virtualized smart card in a cloud computing environment and an apparatus for performing the same.

2. Related Art

In a smart terminal including a radio communication function or a mobile communication function such as a cellular phone, a smartphone, a pad-type terminal, and the like, a smart card is mounted in the form of hardware for the purpose of security and/or authentication of a subscriber, and an authentication manager performs authentication of a user or a subscriber based on credential information obtained from the smart card.

The smart card may include personal information, a phonebook, message, download data, applications, personal setting information of a user, and the like as well as provisioning or subscription information for a cellular phone of the user.

Information of a user or a subscriber is stored in the above-described smart card, and therefore personal information of the user may be easily stored even when the user purchases or exchanges a new smart terminal, thereby easily replacing the smart terminal.

Meanwhile, as the number of smart terminals used by individuals is gradually increased, the number of smart cards which should be mounted in the smart terminal is also increased, costs for manufacturing the smart card are increased due to the increase in the number of smart cards in the form of hardware, and credential information of individuals becomes more difficult to be managed due to its dispersion.

In addition, since operating systems or applications installed in the smart terminals are able to easily access credential information stored in the smart card, important credential information of individuals may be leaked when the smart terminal is exposed to malicious attacks such as hacking or malicious codes.

SUMMARY

Accordingly, example embodiments of the present invention are provided to substantially obviate one or more problems due to limitations and disadvantages of the related art.

Example embodiments of the present invention provide a smart card service method, which may reduce manufacturing costs of a smart card and integrally manage credential information of individuals in a cloud computing environment in which security is enhanced.

Example embodiments of the present invention also provide a smart card service apparatus, which may reduce manufacturing costs of the smart card and integrally manage credential information of individuals in a cloud computing environment in which security is enhanced.

In some example embodiments, a smart card service method, which is performed in an apparatus enabling processing of digital data, includes: receiving a certificate generation request from a terminal; transmitting the certificate generation request to an authentication processing device; and storing credential information with respect to the generated certificate in a virtual machine associated with the terminal in response to a certificate generation success message provided from the authentication processing device.

Here, before the storing of the credential information, the smart card service method may further include: verifying whether the virtual machine associated with the terminal exists; and generating the virtual machine associated with the terminal when the virtual machine associated with the terminal does not exist.

Also, after the storing of the credential information, the smart card service method may further include: receiving an authentication request from the terminal; acquiring the to credential information from the virtual machine associated with the terminal; transmitting the authentication request to the authentication processing device using the acquired credential information; and transmitting, to the terminal, an authentication result received from the authentication processing device.

Also, after the storing of the credential information, the smart card service method may further include: receiving a certificate deletion request from the terminal; acquiring the credential information from the virtual machine associated with the terminal; transmitting the certificate deletion request to the authentication processing device using the acquired credential information; and receiving a certificate deletion result from the authentication processing device.

Also, after the receiving of the certificate deletion result, the smart card service method may further include: verifying whether the credential information exists in the virtual machine associated with the terminal; and deleting the virtual machine associated with the terminal when the credential information does not exist in the virtual machine associated with the terminal.

In other example embodiments, a smart card service apparatus includes: a cloud server configured to include credential information of each of a plurality of user terminals and a plurality of virtual machines for executing a smart card function of each of the user terminals; and an interface unit configured to communicate with an authentication management device so as to receive a request for a process associated with authentication from an arbitrary user terminal and perform the received request for the process using credential information included in a virtual machine associated with the arbitrary user terminal.

Here, the smart card service apparatus may further include a cloud user management unit configured to allow access to the smart card service apparatus only with respect to an authorized user.

Also, the smart card service apparatus may further include a cloud channel management unit configured to manage a communication channel for security of communication between the smart card service apparatus and the plurality of user terminals and communication between the smart card service apparatus and the authentication management device.

Also, the interface unit may receive a certificate generation request from the arbitrary user terminal, transmit the certificate generation request to the authentication management device, and store credential information with respect to the generated certificate in the virtual machine associated with the arbitrary user terminal based on a certificate generation success message provided from the authentication management device.

Also, the interface unit may receive an authentication request from the arbitrary user terminal, acquire the credential information from the virtual machine associated with the arbitrary user terminal, transmit the authentication request to the authentication management device using the acquired credential information, and transmit an authentication result provided from the authentication management device to the arbitrary user terminal.

Also, the interface unit may receive a certificate deletion request from the arbitrary user terminal, acquire the credential information from the virtual machine associated with the arbitrary user terminal, and transmit the certificate deletion request to the authentication management device using the acquired credential information.

Also, the interface unit may receive a message indicating that certificate deletion is successfully performed from the authentication management device, verify whether the credential information exists in the virtual machine associated with the arbitrary user terminal, and delete the virtual machine associated with the arbitrary user terminal when the credential information does not exist in the virtual machine associated with the arbitrary user terminal.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
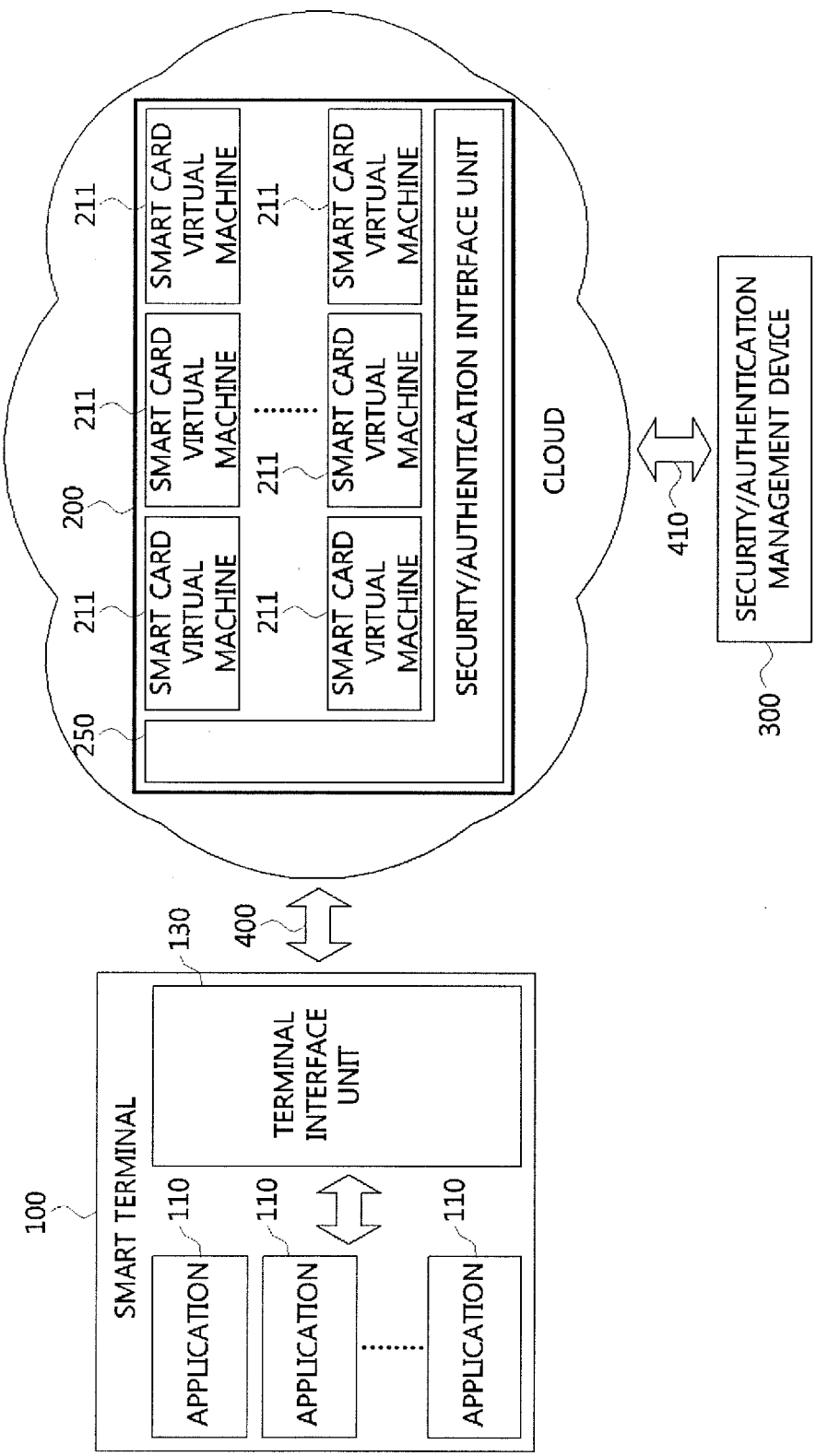
FIG. 1 is a schematic conceptual diagram illustrating a configuration and an operating environment of a smart card service apparatus according to an embodiment of the present invention.

Example embodiments of the present invention are described below in sufficient detail to enable those of ordinary skill in the art to embody and practice the present invention. It is important to understand that the present invention may be embodied in many alternative forms and should not be construed as limited to the example embodiments set forth herein.

Accordingly, while the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims. Elements of the example embodiments are consistently denoted by the same reference numerals throughout the drawings and detailed description.

The terminology used herein to describe embodiments of the invention is not intended to limit the scope of the invention. The articles "a," "an," and "the" are singular in that they have a single referent; however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, numbers, steps, operations, elements, and/or components, but do not preclude the presence or addition of one or more other features, numbers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present invention will be described in detail with reference to the accompanying drawings. In the drawings and description, elements that appear in more than one drawing and/or elements that are mentioned in more than one place in the description are always denoted by the same respective reference numerals and are not described in detail more than once.

A "smart card" used in the present specification may be used as a meaning including credential information for performing security and/or authentication of a user, and may be referred to as other terms such as existing subscriber identity module (SIM), removable user identity module (RUIM), universal subscriber identity module (USIM), universal integrated circuit card (UICC), embedded-UICC (eUICC), and the like.

In addition, a "smart terminal" used in the present specification may be used as a term that defines all terminals or devices required for security and/or authentication in order to use a specific function.

Hereinafter, virtualization technologies and cloud computing technologies which are utilized as technologies for smart card services in the present invention will be briefly described.

In order to well respond to business environments which have been recently rapidly changed, as importance of flexibility to respond well to the changes and a speed to respond quickly to occurrence of the changes has been emerged, virtualization technologies have attracted attention as next generation computing technologies.

The virtualization technologies applied to a server of an existing data center are approaching closer to general users in various areas while showing new virtualization technologies which have rapidly evolved utilizing existing virtualization technologies such as application virtualization, presentation virtualization, and the like.

The virtualization technologies have been generally used in a main frame starting from a virtual memory in the late 1960s, but have been used limitedly in some places for usage due to high introduction costs and a limited use environment. Thereafter, in many areas ranging up to a hypervisor that supports dynamic resource partitioning propelled by several decades of continuous innovation, new technologies of virtualization have been introduced in a stepwise manner.

In addition, as there arise needs for receiving services anytime and anywhere in a distributed computing environment based on the Internet, the virtualization technologies have been developed as actual implementation technologies which constitute an efficient computing infrastructure ranging up to cloud computing and utility computing.

As an existing concept of the virtualization, resource partitioning technology which partitions and utilizes a single resource has been mainly developed starting from server virtualization technology, but virtualization in the advanced form henceforth can be seen to be extended in such a manner that various resources are expanded to an overall group rather than at the level of a single resource so that the expanded resources are managed. Through such development, integrated virtualization of a plurality of servers may be possible and partitioned resources may freely move in a computing environment, and therefore stability of an overall work load may be ensured.

Meanwhile, the cloud computing includes a server, a storage, an application program, and the like in a data center as components, and in the cloud computing, the data center is connected to a terminal through a network to provide services to the terminal.

The server is equipment for performing an actual operation and includes a server computer, an operating system, and the like, and the storage is equipment for storing results and includes a disk, a database, and the like. The application program refers to a program for performing a desired operation using the server and the storage, and the network is responsible for connection between a terminal and a cloud and between the clouds. The terminal is equipment for requesting services or displaying the result and includes a personal computer, a laptop computer, a cellular phone, and the like.

In a smart card service method according to an embodiment of the present invention, a conventional smart card mounted in the form of hardware is virtualized using the above-described virtualization technologies and the cloud computing technologies to thereby constitute a virtual machine (VM), and then smart card VMs that provides smart card services are located in a cloud server of a cloud computing environment.

When a user requests security and/or authentication services using a smart terminal, the smart terminal may be connected to a corresponding smart card VM by accessing a cloud environment through a communication channel in which security is supported.

The smart card VM that provides the smart card services transmits credential information of the user stored in advance to an authentication management device for executing authentication, enables the authentication management device to execute an authentication procedure using the transmitted credential information of the user, receives an authentication result from the authentication management device, and then transmits the received authentication result to the smart terminal of the user through a communication channel with enhanced security.

In addition, according to an embodiment of the present invention, when an application installed in the smart terminal of the user requests security and/or authentication, an interface that allows the same interface as the existing one to be used may be provided.

In addition, a smart card VM that exists in the cloud computing environment may be configured to be operated using an existing interface supported by an existing authentication management device, and therefore an existing application and authentication management device which are operated in an environment using the smart card in the form of hardware are used as is without separately reconfiguring or changing the existing application and authentication management device.

FIG. 1 is a schematic conceptual diagram illustrating a configuration and an operating environment of a smart card service apparatus according to an embodiment of the present invention.

Referring to FIG. 1, in a smart card service system according to an embodiment of the present invention, a smart terminal 100, a smart card service apparatus 200, and a security/authentication management device 300 may be operated in an environment in which the smart terminal 100, the smart card service apparatus 200, and the security/authentication management device 300 are connected to each other through a wired or wireless network 400 or 410.

The smart terminal 100 may include at least one application 110 that requests security and/or authentication, and a terminal interface unit 130 that is responsible for an interface function for transmitting and receiving requests for security and/or authentication and authentication results between the application 110 and the smart card service apparatus 200.

The at least one application 110 installed in the smart terminal 100 may request security and/or an authentication operation using an application programming interface (API) provided from the terminal interface unit 130, and receive the security and/or authentication results through the terminal interface unit 130 to determine the results. Here, the API provided by the terminal interface may be the same as an API provided by the terminal interface unit 130 of the existing smart terminal 100 in which a smart card in the form of hardware is mounted.

The smart card service apparatus 200 may be located in a cloud computing environment, and configured in the form of a virtualization server that supports a virtualization function.

The smart card service apparatus 200 may include a plurality of smart card VMs 211 that support smart card functions and a security/authentication interface unit 250, and integrally manage credential information of a plurality of users. Here, each of the plurality of smart card VMs 211 may support the smart card function, and for this, include credential information of a designated user.

The security/authentication interface unit 250 performs an interface function corresponding to the terminal interface unit 130 provided in the smart terminal 100. In addition, the security/authentication interface unit 250 performs an interface function for security and/or authentication with the security/authentication management device 300.

Specifically, the security/authentication interface unit 250 receives requests for certificate generation, authentication request, certificate deletion, and the like through the network 400 from the terminal interface unit 130 provided in the smart terminal 100, and cooperates with the security/authentication management device 300 in order to perform operations corresponding to the received requests.

The security/authentication management device 300 is connected to the smart card service apparatus 200 through the network 410, performs the corresponding function in response to the security and/or authentication requests provided through the security/authentication interface unit 250 provided in the smart card service apparatus 200, and then provides the result to the smart card service apparatus 200. Here, the security/authentication management device 300 may perform functions such as certificate generation, authentication, certificate deletion, and the like, and provide, to the smart card service apparatus 200, the results with respect to whether the certificate is successfully generated, whether the authentication is successfully performed, whether the certificate is successfully deleted.

Figure 2:
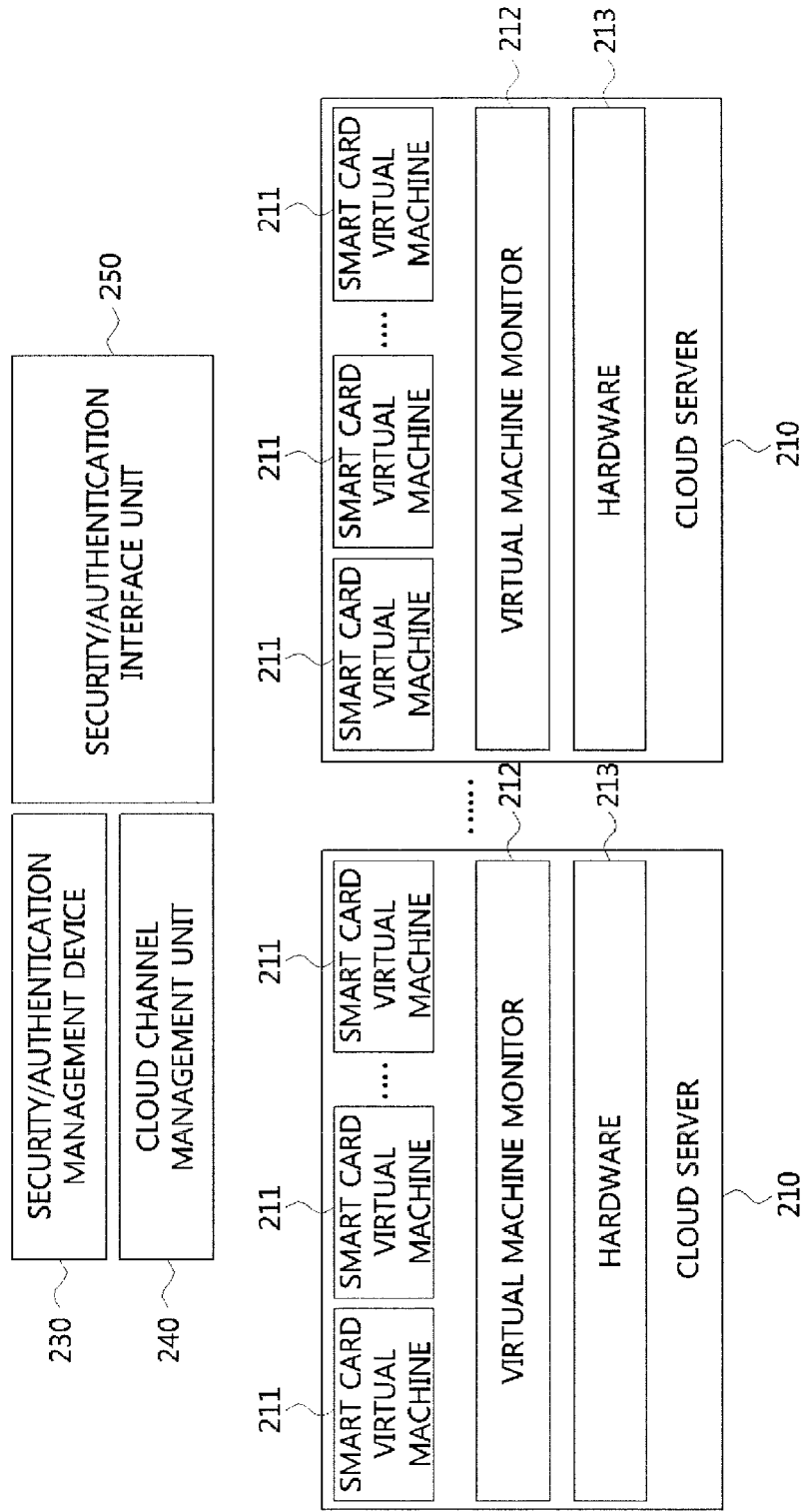
FIG. 2 is a detailed block diagram illustrating a configuration of a smart card service apparatus according to an embodiment of the present invention.

FIG. 2 is a detailed block diagram illustrating a configuration of a smart card service apparatus according to an embodiment of the present invention.

Referring to FIG. 2, the smart card service apparatus 200 may include at least one cloud server 210, a cloud user management unit 230, a cloud channel management unit 240, and a security/authentication interface unit 250.

Each cloud server 210 may include a plurality of smart card VMs 211 that support smart card services, a VM monitor 212, and hardware 213.

Each of the plurality of smart card VMs 211 executes a smart card service operation, and for this, includes credential information associated with each smart card.

The VM monitor 212 performs a function of a virtual platform or a hypervisor for simultaneously performing the plurality of smart card VMs 211 which exist above the VM monitor 212. That is, the VM monitor 212 supports each of the smart card VMs 211 to execute the same operations as operations of the smart terminal 100 in which conventional smart card hardware is provided.

The hardware 213 may include a memory, an input/output interface, a processor, and the like, which configure hardware of the cloud server 210.

The cloud user management unit 230 manages information about cloud user accounts managed within a cloud. That is, when an arbitrary user attempts to access the cloud (or the smart card service apparatus), the cloud user management unit 230 determines whether the arbitrary user is an authorized user based on login information input by the user, grants the access to the cloud when the arbitrary user is the authorized user, and denies the access when the arbitrary user is not the authorized user. In addition, the cloud user management unit 230 may grant access only to the smart card VM 211 designated in advance, to the arbitrary user when the arbitrary user is the authorized user.

The cloud channel management unit 240 manages a communication channel for security communication between the smart terminal 100 and the cloud server 210 and security communication between the cloud server 210 and the security/authentication management device 300. For the above-described security communication, the cloud channel management unit 240 may support communication encrypted between the cloud server 210 and the smart terminal 100 or between the cloud server 210 and the security/authentication management device 300, or support the communication to be performed using a security communication protocol set in advance.

The security/authentication interface unit 250 receives requests for certificate generation, authentication request, certificate deletion, and the like from the terminal interface unit 130 of the smart terminal 100 through the network 400, and cooperates with the security/authentication management device 300 in order to perform operations corresponding to the received requests.

Specifically, in case of the certificate generation, the security/authentication interface unit 250 provides a certificate generation request to the security/authentication management device 300 to enable a new certificate to be generated, and creates credential information with respect to the generated certificate to the corresponding smart card VM. Here, when the smart card VM associated with a user (or the smart terminal) that has requested the certificate generation does not exist, the security/authentication interface unit 250 may newly generate a smart card VM associated with the user that has requested the certificate generation.

Here, in case of the authentication request, the security/authentication interface unit 250 acquires credential information from the corresponding smart card VM 211 whose authentication is requested, transmits the acquired credential information to the security/authentication management device 300 to perform an authentication procedure, and transmits the authentication result provided from the security/authentication management device 300 to the smart terminal.

In addition, in case of the certificate deletion, the security/authentication interface unit 250 provides a deletion request of the corresponding certificate to the security/authentication management device 300, and deletes credential information corresponding to the deleted certificate from the corresponding smart card VM. In addition, when the credential information does not exist anymore in the smart card VM associated with the user (or the smart terminal) that has requested the certificate deletion, the security/authentication interface unit 250 may delete the corresponding smart card VM.

Figure 3:
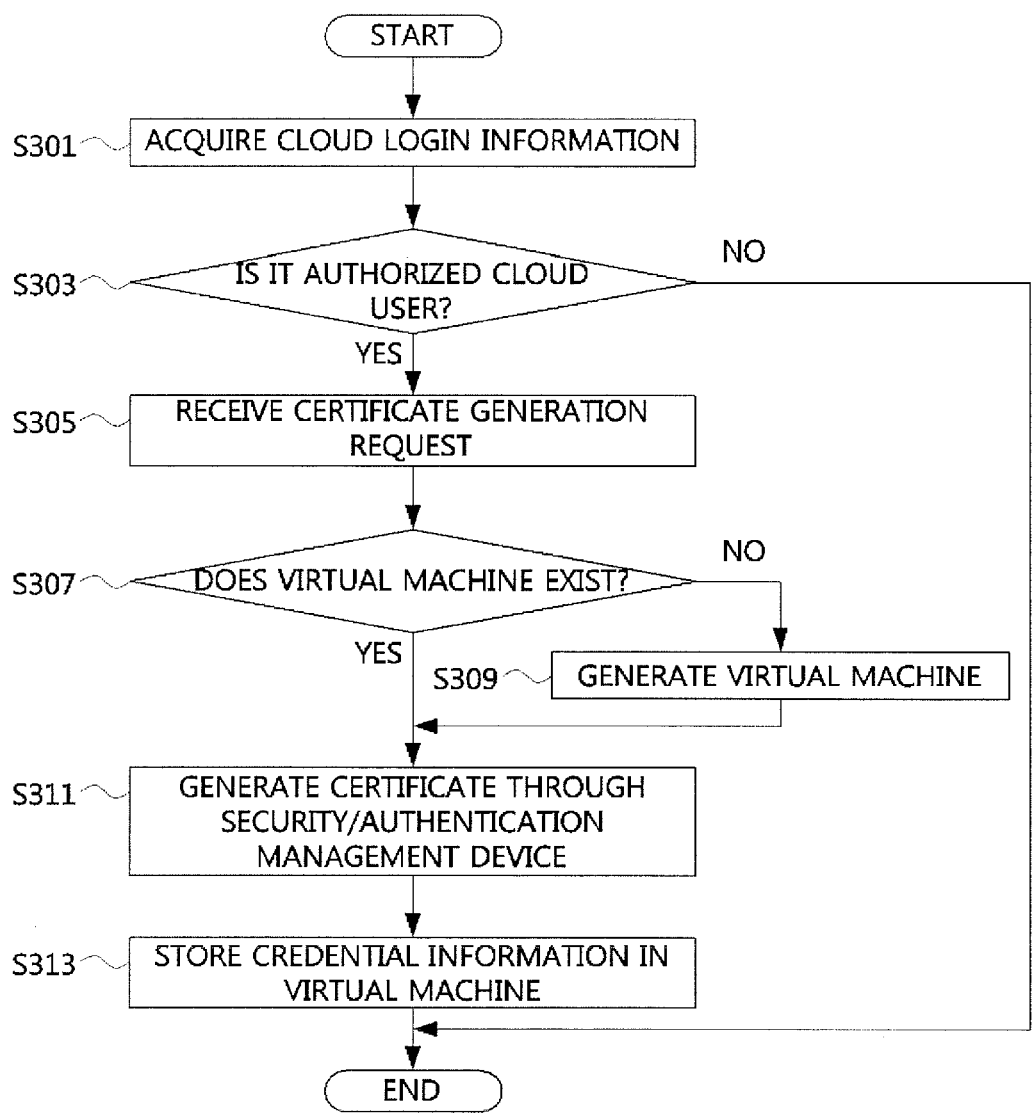
FIG. 3 is a flowchart illustrating a certificate generation process in a smart card service method according to an embodiment of the present invention.

FIG. 3 is a flowchart illustrating a certificate generation process in a smart card service method according to an embodiment of the present invention. The certificate generation process shown in FIG. 3 may be performed in the smart card service apparatus 200 shown in FIG. 2.

Referring to FIG. 3, in operation S301, the smart card service apparatus acquires cloud login information used for accessing a cloud (or the smart card service apparatus), from a smart terminal.

Next, in operation S303, the smart card service apparatus determines whether a user of the smart terminal is an authorized user capable of accessing the cloud based on the acquired login information. Here, the smart card service apparatus may verify whether the login information acquired from the smart terminal exists in a list of users allowed to access the cloud, and then determine that the user of the smart terminal is the authorized user capable of accessing the cloud when the login information exists in the list of users allowed to access the cloud.

The smart card service apparatus blocks the access to the cloud with respect to a user which is not authorized in accordance with the determination result of operation S303, and terminates the certificate generation process. Here, the smart card service apparatus may transmit, to the smart terminal of the user that has attempted to access the cloud, a message indicating that the user of the smart terminal is not an authorized user.

Meanwhile, in operation S305, when the user that attempts to access the cloud is determined to be the authorized user in operation S303, the smart card service apparatus allows the access of the user to the cloud, and receives a message indicating a certificate generation request from the smart terminal of the user.

Next, in operation S307, the smart card service apparatus determines whether a smart card VM allocated to the user (or the smart terminal of the user) that has requested the certificate generation exists.

In operation S309, when the smart card VM allocated to the user that has requested the certificate generation does not exist in accordance with the determination result of operation S307, the smart card service apparatus generates a new smart card VM that can support smart card services to the user (or the smart terminal).

Next, in operation S311, the smart card service apparatus transmits a message indicating generation of a new certificate to the security/authentication management device. Here, the security/authentication management device may newly generate the certificate of the user in response to the certificate generation request received from the smart card service apparatus, and transmit, to the smart card service apparatus, a message indicating that the certificate generation is successfully completed. Here, the smart card service apparatus may recognize that the certificate generation is completed through a certificate generation completion message provided from the security/authentication management device.

In operation S313, when the certificate generation is completed, the smart card service apparatus stores credential information with respect to the generated certificate in the corresponding smart card VM.

Figure 4:
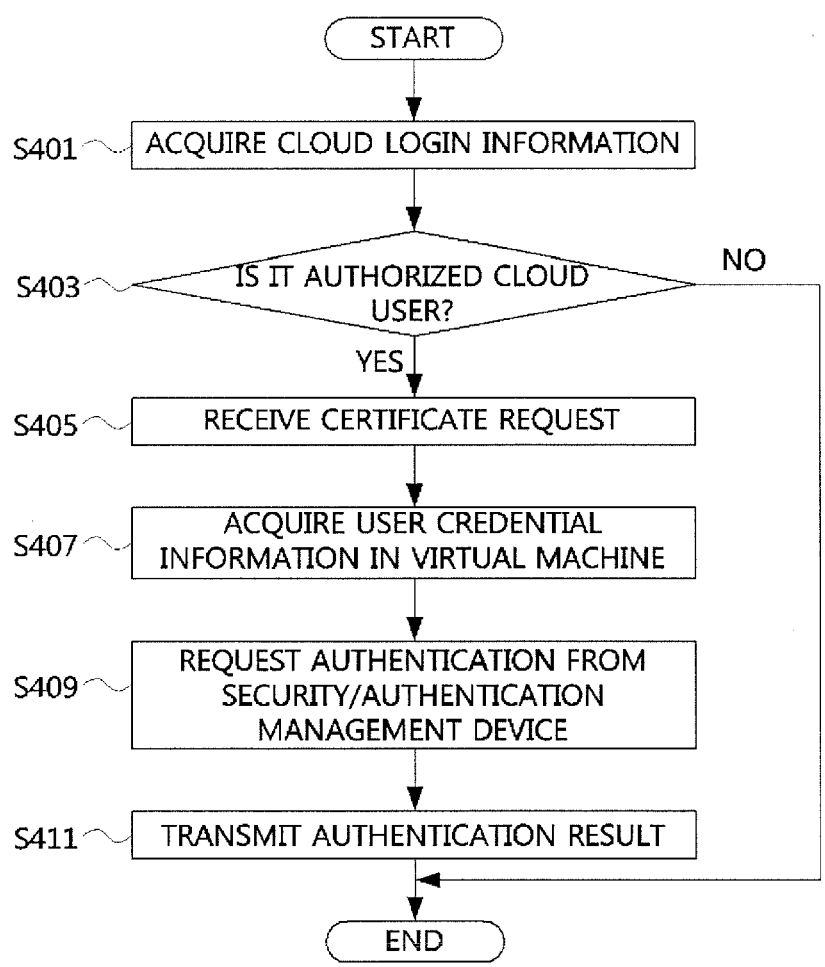
FIG. 4 is a flowchart illustrating an authentication processing process in a smart card service method according to an embodiment of the present invention.

FIG. 4 is a flowchart illustrating an authentication processing process in a smart card service method according to an embodiment of the present invention. The authentication processing process shown in FIG. 4 may be performed in the smart card service apparatus 200 shown in FIG. 2, and may be performed after the certificate generation process shown in FIG. 3 is performed.

Referring to FIG. 4, in operation S401, the smart card service apparatus acquires cloud login information used for accessing a cloud (or the smart card service apparatus), from a smart terminal.

Next, in operation S403, the smart card service apparatus determines whether a user of the smart terminal is an authorized user capable of accessing the cloud based on the acquired login information. Here, the smart card service apparatus may verify whether the login information acquired from the smart terminal exists in a list of users allowed to access the cloud, and then determine that the user of the smart terminal is the authorized user capable of accessing the cloud when the login information exists in the list of users allowed to access the cloud.

The smart card service apparatus blocks the access to the cloud with respect to a user which is not authorized in accordance with the determination result of operation S403, and terminates the authentication processing process.

Meanwhile, in operation S403, when the user that attempts to access the cloud is determined to be the authorized user in operation S403, the smart card service apparatus allows the access of the user to the cloud, and receives a message indicating the authentication request from the smart terminal of the user.

Next, in operation S407, the smart card service apparatus acquires credential information of the user from the smart card VM allocated to the user (or the smart terminal of the user) that has requested the authentication.

In operation S409, the smart card service apparatus transmits a message for requesting authentication of a corresponding user to the security/authentication management device using the acquired credential information of the user. Here, the security/authentication management device performs a user authentication procedure based on the credential information of the user received from the smart card service apparatus, and provides the authentication result to the smart card service apparatus.

In operation S411, the smart card service apparatus transmits, to the smart terminal, authentication result information received from the security/authentication management device. Here, the smart card service apparatus may transmit an authentication success message or an authentication failure message to the smart terminal of the user that has requested the authentication, based on the authentication result information received from the security/authentication management device.

Figure 5:
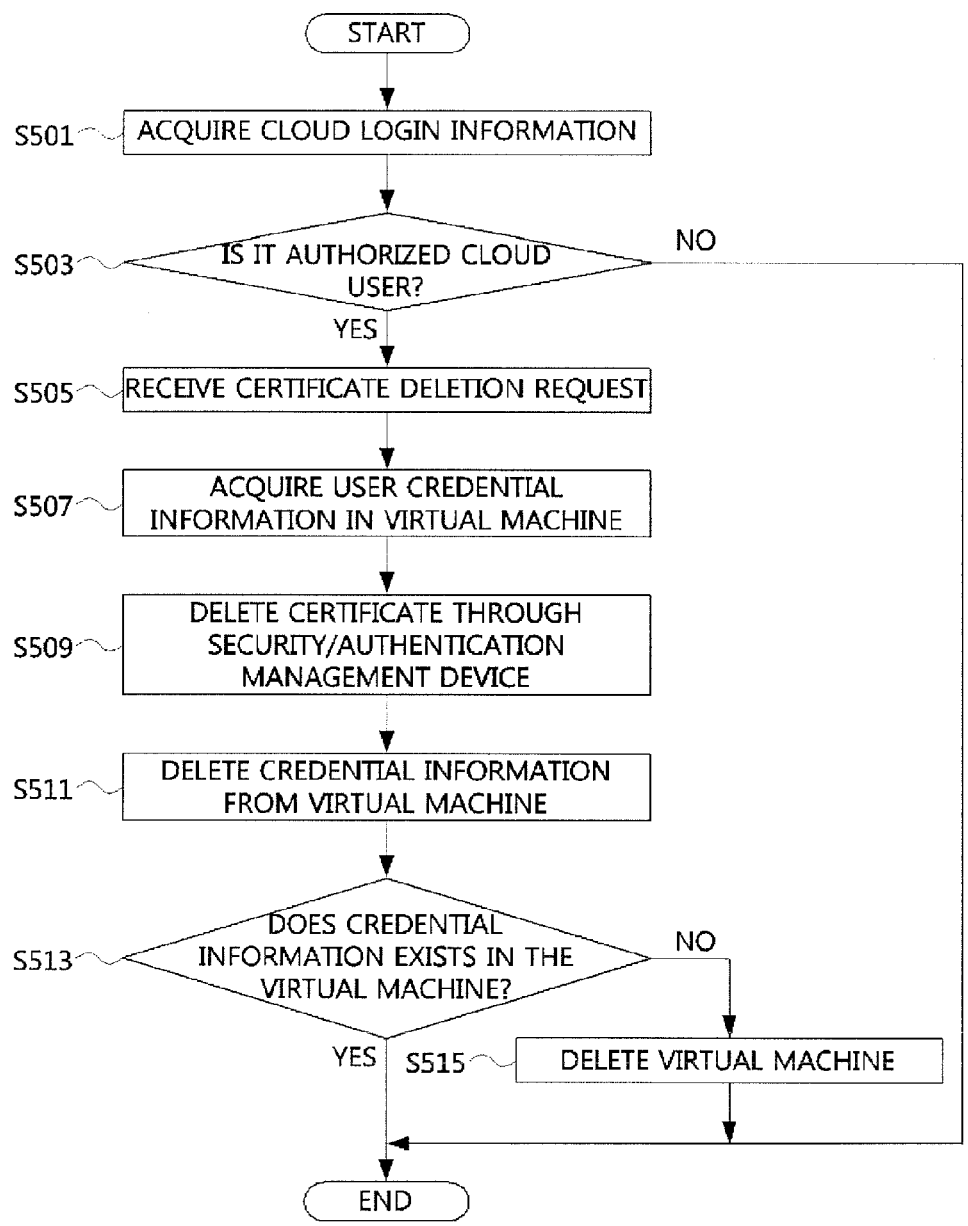
FIG. 5 is a flowchart illustrating a certificate deletion process in a smart card service method according to an embodiment of the present invention.

FIG. 5 is a flowchart illustrating a certificate deletion process in a smart card service method according to an embodiment of the present invention. The certificate deletion process shown in FIG. 5 may be performed in the smart card service apparatus 200 shown in FIG. 2.

Referring to FIG. 5, in operation S501, the smart card service apparatus acquires cloud login information used for accessing a cloud (or the smart card service apparatus), from the smart terminal.

Next, in operation S503, the smart card service apparatus determines whether a user of the smart terminal is an authorized user capable of accessing the cloud based on the acquired login information. Here, the smart card service apparatus verifies whether the login information acquired from the smart terminal exists in a list of users allowed to access the cloud, and then determines that the user of the smart terminal is the authorized user capable of accessing the cloud when the login information acquired from the smart terminal exists in the list of users allowed to access the cloud.

The smart card service apparatus blocks the access to the cloud with respect to a user which is not authorized in accordance with the determination result of operation S503, and terminates the certificate deletion process.

Meanwhile, in operation S505, when the user that attempts to access the cloud is determined to be the authorized user in operation S503, the smart card service apparatus allows the access of the user to the cloud, and receives a message indicating the certificate deletion request from the smart terminal of the user.

Next, in operation S507, the smart card service apparatus acquires credential information of the user from the smart card VM allocated to the user (or the smart terminal of the user) that has requested the certificate deletion.

Next, in operation S509, the smart card service apparatus transmits a message indicating deletion of a corresponding certificate to the security/authentication management device. Here, the security/authentication management device may delete a certificate of the user in response to the certificate deletion request received from the smart card service apparatus, and then transmit, to the smart card service apparatus, a message indicating that the certificate deletion is successfully completed. Here, the smart card service apparatus may recognize that the certificate deletion is completed through a certificate deletion completion message provided from the security/authentication management device.

In operation S513, when the certificate deletion is completed, the smart card service apparatus determines whether remaining credential information of the user exists in the smart card VM allocated to the user that has requested the certificate deletion.

When the credential information of the user exists in the smart card VM allocated to the user that has requested the certificate deletion in accordance with the determination result of operation S513, the smart card service apparatus completes the certificate deletion process.

However, in operation S515, when the credential information of the user does not exist in the smart card VM anymore in accordance with the determination result of operation S513, the smart card service apparatus deletes the corresponding smart card VM.

As described above, in the smart card service method and the apparatus for performing the same according to the embodiments of the present invention, a smart card configured in the form of existing hardware may be virtualized and the virtualized smart card may be serviced in a cloud computing environment, thereby reducing manufacturing costs of smart card hardware, and supporting the smart card services in a more enhanced security environment.

In addition, the smart card services may be provided so as not to change an existing user interface, thereby easily switching a use environment from an existing use environment to a new cloud computing environment.

While example embodiments of the present invention and their advantages have been described in detail, it should be understood that various changes, substitutions, and alterations may be made herein without departing from the scope of the invention.

What is claimed is:

1. A smart card service method, which is performed in an apparatus enabling processing of digital data and having a hardware, the hardware including a memory and a processor, the smart card service method comprising:
 receiving a certificate generation request from a terminal by a security/authentication interface unit which operates on the hardware and is connected to a terminal interface unit of the terminal through a network;
 generating a virtual machine associated with the terminal on the hardware to support security or authentication service to at least one application of the terminal when the virtual machine associated with the terminal does not exist in a cloud server included in the apparatus and configured in the form of a virtualization server that supports a virtualization function to the terminal;
 transmitting the certificate generation request to a security/authentication management device which is connected to the security/authentication interface unit through a network;
 storing credential information with respect to a certificate in the virtual machine, wherein the certificate is generated in response to a certificate generation success message provided from the security/authentication management device;
 receiving a certificate deletion request from the terminal;
 acquiring the credential information from the virtual machine associated with the terminal;
 transmitting the certificate deletion request to the security/authentication management device using the acquired credential information;
 receiving a certificate deletion result from the security/authentication management device;
 verifying the credential information in the virtual machine associated with the terminal; and
 when the credential information does not exist, deleting the virtual machine associated with the terminal,
 wherein the virtual machine is generated to correspond to a subscriber identity module of the terminal, and is located in the cloud server of the apparatus.

2. The smart card service method of claim 1, after the storing of the credential information, further comprising;
 receiving an authentication request from the terminal;
 acquiring the credential information from the virtual machine associated with the terminal;
 transmitting the authentication request to the security/authentication management device using the acquired credential information; and
 transmitting, to the terminal, an authentication result received from the security/authentication management device.

3. A smart card service apparatus enabling processing of digital data and having a hardware, the hardware including a memory and a processor, comprising:
 a cloud server configured to include a plurality of virtual machines respectively comprising credential information of each of a plurality of user terminals and respectively executing a smart card function of each of the user terminals, and a virtual machine monitor configured to perform a function of a virtual platform for simultaneously performing the plurality of virtual machines; and
 a security/authentication interface unit configured to communicate with a security/authentication management device so as to receive a request for a process associated with authentication from a user terminal and perform the received request for the process using credential information included in a virtual machine associated with the user terminal,
 wherein the virtual machine is generated to correspond to a subscriber identity module of the terminal, and is located in the cloud server,
 wherein the security/authentication interface unit receives a certificate generation request from the user terminal, transmits the certificate generation request to the security/authentication management device, and stores credential information with respect to a certificate in the virtual machine associated with the user terminal, the certificate being generated based on a certificate generation success message provided from the security/authentication management device,
 wherein the security/authentication interface unit receives a certificate deletion request from the user terminal, acquires the credential information from the virtual machine associated with the user terminal, and transmits the certificate deletion request to the security/authentication management device using the acquired credential information,
 wherein the security/authentication interface unit receives a message indicating that certificate deletion is successfully performed from the security/authentication management device, verifies the credential information in the virtual machine associated with the user terminal, and when the credential information does not exist, deleting the virtual machine associated with the user terminal.

4. The smart card service apparatus of claim 3, further comprising a cloud user management unit configured to avow access to the smart card service apparatus only with respect to an authorized user.

5. The smart card service apparatus of claim 3, further comprising a cloud channel management unit configured to manage a communication channel for security of communication between the smart card service apparatus and the plurality of user terminals and communication between the smart card service apparatus and the security/authentication management device.

6. The smart card service apparatus of claim 3, wherein the security/authentication interface unit receives an authentication request from the user terminal, acquires the credential information from the virtual machine associated with the user terminal, transmits the authentication request to the security/authentication management device using the acquired credential information, and transmits an authentication result provided from the security/authentication management device to the user terminal.

* * * * *